United States Patent
Galin et al.

(10) Patent No.: US 11,584,531 B2
(45) Date of Patent: Feb. 21, 2023

(54) AIRCRAFT WITH CREW QUARTERS

(71) Applicant: Bombardier Inc., Dorval (CA)

(72) Inventors: Alexandre Galin, Montreal (CA); John Ferneley, Etobicoke (CA); Thomas Ahn, Lachine (CA); Siddhartho Konstantin Banerjee, Saint-Laurent (CA)

(73) Assignee: BOMBARDIER INC.

( * ) Notice: Subject to any disclaimer, the term of this patent is extended or adjusted under 35 U.S.C. 154(b) by 339 days.

(21) Appl. No.: 16/879,137

(22) Filed: May 20, 2020

(65) Prior Publication Data

US 2020/0369390 A1 Nov. 26, 2020

Related U.S. Application Data

(60) Provisional application No. 62/949,674, filed on Dec. 18, 2019, provisional application No. 62/850,632, filed on May 21, 2019.

(51) Int. Cl.
*B64D 11/06* (2006.01)
*B64D 11/00* (2006.01)

(52) U.S. Cl.
CPC ...... *B64D 11/0691* (2014.12); *B64D 11/0641* (2014.12); *B64D 2011/0076* (2013.01)

(58) Field of Classification Search
CPC .................. B64D 11/0691; B64D 11/0641
See application file for complete search history.

(56) References Cited

U.S. PATENT DOCUMENTS

| | | | |
|---|---|---|---|
| 2,608,366 A * | 8/1952 | Jergenson | 244/118.6 |
| 6,152,400 A | 11/2000 | Sankrithi et al. | |
| 6,464,169 B1 | 10/2002 | Johnson et al. | |
| 7,156,344 B1 | 1/2007 | Guering | |
| 8,727,277 B2 * | 5/2014 | Guering | 244/118.1 |
| 9,403,465 B2 | 8/2016 | Kircher et al. | |
| 9,896,209 B2 | 2/2018 | Wartena | |

FOREIGN PATENT DOCUMENTS

| CN | 110271458 A * | 9/2019 | ......... B64D 11/0641 |
|---|---|---|---|
| EP | 2923946 B1 * | 5/2018 | ......... B64D 11/0601 |

* cited by examiner

*Primary Examiner* — Anthony D Barfield
(74) *Attorney, Agent, or Firm* — Norton Rose Fulbright Canada

(57) ABSTRACT

An aircraft is disclosed with a fuselage including a cabin delimited by a cabin floor and having crew quarters. The crew quarters include an upper portion above a floor plane defined by the cabin floor and a lower portion beneath the floor plane. The crew quarters include a seat adjustable between a sitting configuration and a berthing configuration. A method of transitioning a crew member of an aircraft to a berthing configuration in a crew quarters is also disclosed.

19 Claims, 5 Drawing Sheets

AIRCRAFT WITH CREW QUARTERS

CROSS-REFERENCE TO RELATED APPLICATIONS

This application claims priority to U.S. provisional patent application 62/850,632 filed May 21, 2019, and to U.S. provisional patent application 62/949,674 filed Dec. 18, 2019, the entire contents of each of which is incorporated by reference herein.

TECHNICAL FIELD

The application relates generally to aircraft and, more particularly, to aircraft with crew quarters.

BACKGROUND

For long flights, the crew which services passengers may require an area where they can rest and relax. In larger commercial aircraft with wide bodies, crew rest areas may be located above the ceiling liner, either in the forward or aft end of the cabin. However, for smaller aircraft with narrow bodies, such as business aircraft, the crew rest area may be at the level of the cabin floor, and thus occupy valuable cabin volume or add to the fuselage volume. In these arrangements, the crew rest area is typically close to service areas (e.g. lavatory) such that the crew may be disturbed while resting. Furthermore, the rest area may only offer the minimum necessary amenities to provide rest and relaxation for the resting crew member. Crew rest areas for smaller-bodied aircraft may be in high-traffic areas, offer minimal privacy, and be cramped.

SUMMARY

There is disclosed an aircraft, comprising: a fuselage including a cabin delimited by a cabin floor and having a passenger section and crew quarters separated from the passenger section, the crew quarters including an upper portion above a floor plane defined by the cabin floor and a lower portion beneath the floor plane, the crew quarters including a seat being adjustable between a sitting configuration and a berthing configuration, the seat being upright in the sitting configuration such that a crew member in the seat is within both the upper and lower portions of the crew quarters.

In an embodiment, the crew member in the seat is only within the lower portion in the berthing configuration.

In an embodiment, the crew member in the berthing configuration is lying down in the seat in the lower portion of the crew quarters.

In an embodiment, the seat is horizontal in the berthing configuration.

In an embodiment, the seat includes a foot rest, a seat pan, and a seatback, the foot rest and the seatback being upright in the sitting configuration, the foot rest and the seatback being horizontal in the berthing configuration.

In an embodiment, the seat pan and the foot rest are disposed in the lower portion in the sitting and berthing configurations.

In an embodiment, the seatback is disposed in the lower portion in the berthing configuration.

In an embodiment, the seatback is disposed in both the lower and upper portions in the sitting configuration.

In an embodiment, the lower portion includes a berthing cavity delimited at an upper end by the cabin floor and at a lower end with a crew quarters floor, the foot rest being positioned within the berthing cavity in the berthing configuration.

In an embodiment, the lower portion includes a berthing cavity delimited at an upper end by the cabin floor and at a lower end with a crew quarters floor, at least part of the crew member in the seat being within the berthing cavity in the berthing configuration.

In an embodiment, the fuselage has an internal wall extending upright from the cabin floor and delimiting the crew quarters, a door being hingedly mounted about an opening in the internal wall to provide access to the crew quarters.

In an embodiment, the crew quarters are disposed aft of a forward entrance to the fuselage and forward of the passenger section.

In an embodiment, the crew quarters are disposed aft of a cockpit of the aircraft and forward of the passenger section.

In an embodiment, the seat includes seat axis being transverse to a longitudinal axis of the aircraft.

In an embodiment, the seat is a first seat and the crew quarters include a second seat, the first and second seats being spaced apart along a longitudinal axis of the aircraft, the first and second seats including a seat axis being transverse to the longitudinal axis.

There is disclosed a method of transitioning a crew member of an aircraft to a berthing configuration in a crew quarters of the aircraft, the method comprising: sitting in a seat in the crew quarters such that part of the crew member is above a level of a floor of a cabin of the aircraft and another part of the crew member is below the level of the floor, and reclining the seat such that the crew member is beneath the level of the floor in the berthing configuration.

In an embodiment, reclining the seat includes reclining the seat such that legs of the crew member are underneath the floor of the cabin in the berthing configuration.

In an embodiment, the method comprises descending stairs from the floor of the cabin to the seat.

In an embodiment, the method comprises entering the crew quarters via an opening in an internal wall separating the crew quarters from a remainder of the cabin of the aircraft.

In an embodiment, reclining the seat includes reclining the seat in a direction transverse to a longitudinal axis of the aircraft.

There is disclosed an aircraft, comprising: a fuselage including a cabin delimited by a cabin floor, the cabin having a passenger section and a galley; and crew quarters within the galley, the crew quarters having an access opening, an upper portion of the crew quarters above a floor plane defined by the cabin floor, and a lower portion beneath the floor plane, the crew quarters including a seat being adjustable between a sitting configuration and a berthing configuration, the seat being upright in the sitting configuration such that a crew member in the seat is within both the upper and lower portions of the crew quarters.

There is disclosed an aircraft, comprising: a fuselage including a cabin delimited by a cabin floor, the cabin having a passenger section and a galley; and crew quarters within the galley, the crew quarters having an access opening, an upper portion of the crew quarters above a floor plane defined by the cabin floor, and a lower portion beneath the floor plane, the crew quarters including an adjustable seat.

There is disclosed the following additional features to be used in any combination with each other or with any feature described above.

For one possible feature, the galley has a cabinet extending upwardly from the cabin floor, the cabinet defining an interior volume forming part of the upper portion of the crew quarters.

For one possible feature, the cabinet has an upright wall and a counter mounted at an upper end of the upright wall, the access opening for the crew quarters defined in the upright wall, the cabinet having a door to open and close the access opening.

For one possible feature, a floor portion of the access opening for the crew quarters is defined in the cabin floor adjacent to the upright wall of the cabinet, a trap door hingedly mounted to the cabin floor to open and close the floor portion of the access opening.

For one possible feature, the access opening is closeable by a door.

For one possible feature, the crew member in the seat is only within the lower portion in the berthing configuration.

For one possible feature, the crew member in the berthing configuration is lying down in the seat in the lower portion of the crew quarters.

For one possible feature, the seat is horizontal in the berthing configuration.

For one possible feature, the lower portion includes a berthing cavity delimited at an upper end by the cabin floor and at a lower end with a crew quarters floor, at least part of the crew member in the seat being within the berthing cavity in the berthing configuration.

For one possible feature, the crew quarters are disposed aft of the passenger section.

For one possible feature, the seat includes seat axis being transverse to a longitudinal axis of the aircraft.

For one possible feature, the seat is a first seat and the crew quarters include a second seat, the first and second seats being vertically spaced apart.

DESCRIPTION OF THE DRAWINGS

Reference is now made to the accompanying figures in which.

DETAILED DESCRIPTION

Figure 1:
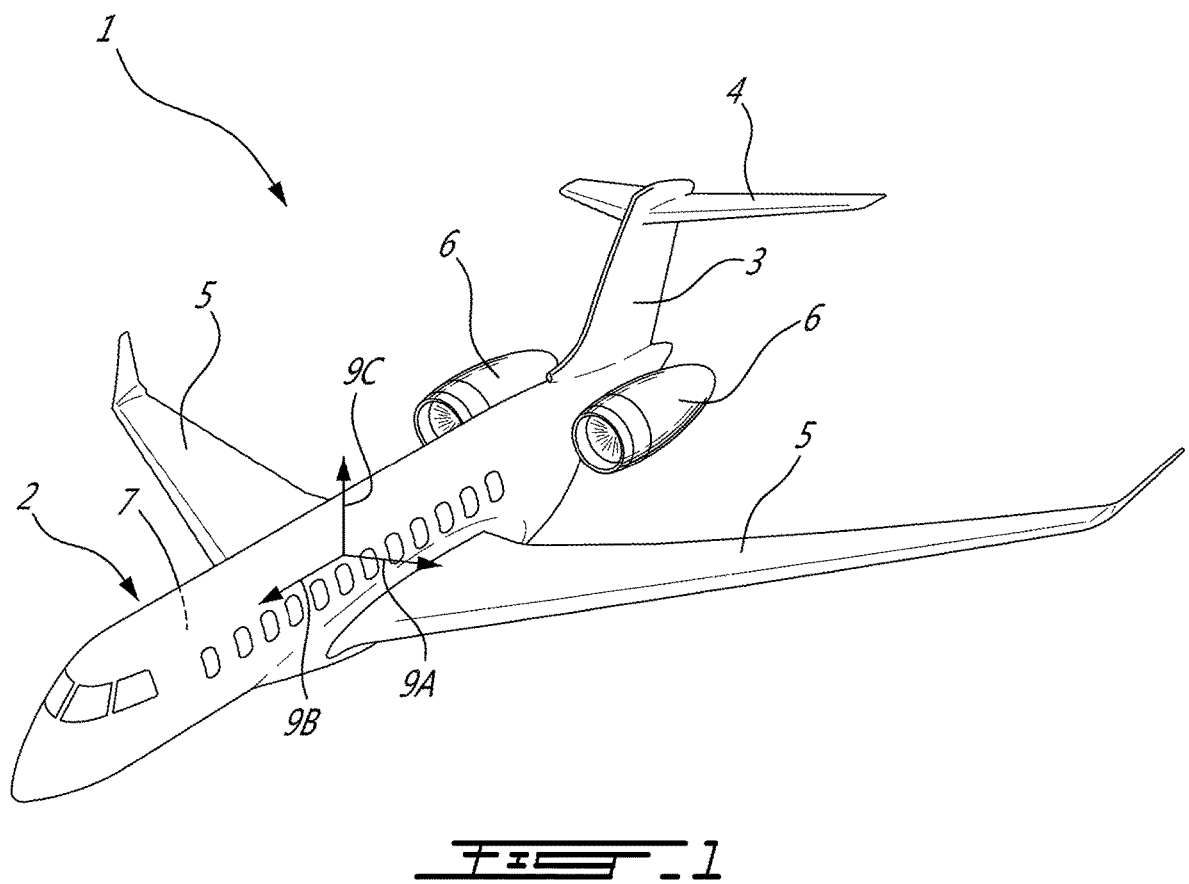
FIG. 1 is a schematic tridimensional view of an aircraft.

Referring to the drawings and more particularly to FIG. 1, an aircraft is shown at 1, and is generally described to illustrate some components for reference purposes in the present disclosure. The aircraft 1 has a fuselage 2 having a fore end and an aft end, with a cabin 7 generally located between the cockpit and the tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 supported by the fuselage 2 in the depicted embodiment, although for other aircraft they can be mounted to the wings 5. The aircraft 1 is shown as a jet-engine aircraft, but may also be a propeller aircraft. It is also understood that the aircraft 1 can be a business aircraft, alternately it can be any other type of aircraft, including, but not limited to, a commercial aircraft or a military aircraft, manned or unmanned.

During flight, the aircraft 1 is free to rotate about three perpendicular axes of motion. More particularly, during flight the aircraft 1 is free to pitch about a transverse or lateral axis 9A which extends between the tips of the wings 5, to roll or bank about a longitudinal axis 9B extending from the nose to the tail assembly, and to yaw about a vertical axis 9C extending from a top of the aircraft 1 to its bottom. These axes 9A,9B,9C move with the aircraft 1 and define one of its frames of reference.

Figure 2A:
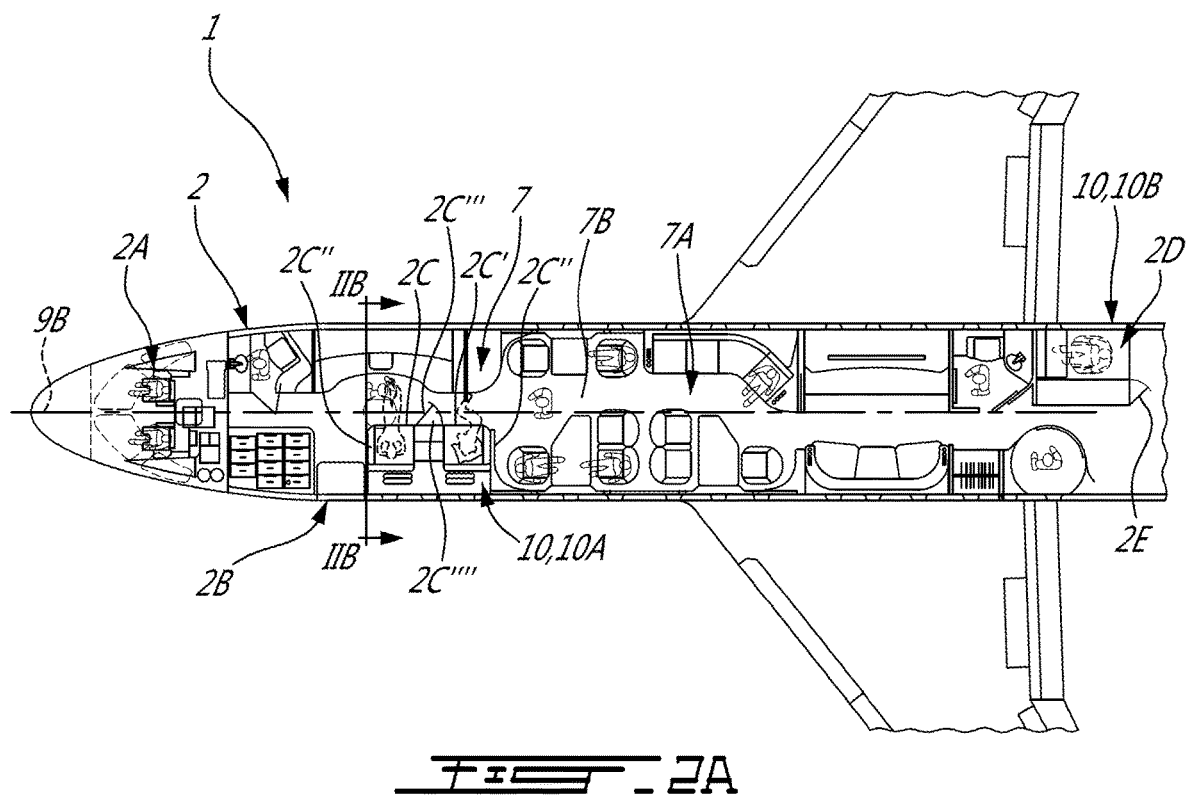
FIG. 2A is a top plan view showing a cabin of a fuselage of the aircraft of FIG. 1, and crew quarters.

FIG. 2A shows an interior of the fuselage 2. FIG. 2A shows the cabin 7 which has a passenger section 7A for accommodating seated passengers of the aircraft 1. Other sections of the fuselage 2 shown in FIG. 2A include the cockpit 2A at a forward end of the aircraft 2, and a galley 2D aft of the passenger section 7A. Passengers and crew enter the cabin 7 via an entrance 2B. The entrance 2B is formed by an opening in the fuselage 2 which is selectively closed by a door. The cabin 7 is delimited along its lower end by a cabin floor 7B. The cabin floor 7B extends throughout most of the length of the fuselage 2. The cabin floor 7B defines a surface which is visible to the passengers in the cabin 7, and along which the passengers walk throughout the cabin 7. The upper and side portions of the cabin 7 are also delimited by the inner surfaces of the fuselage 2.

Figure 2B:
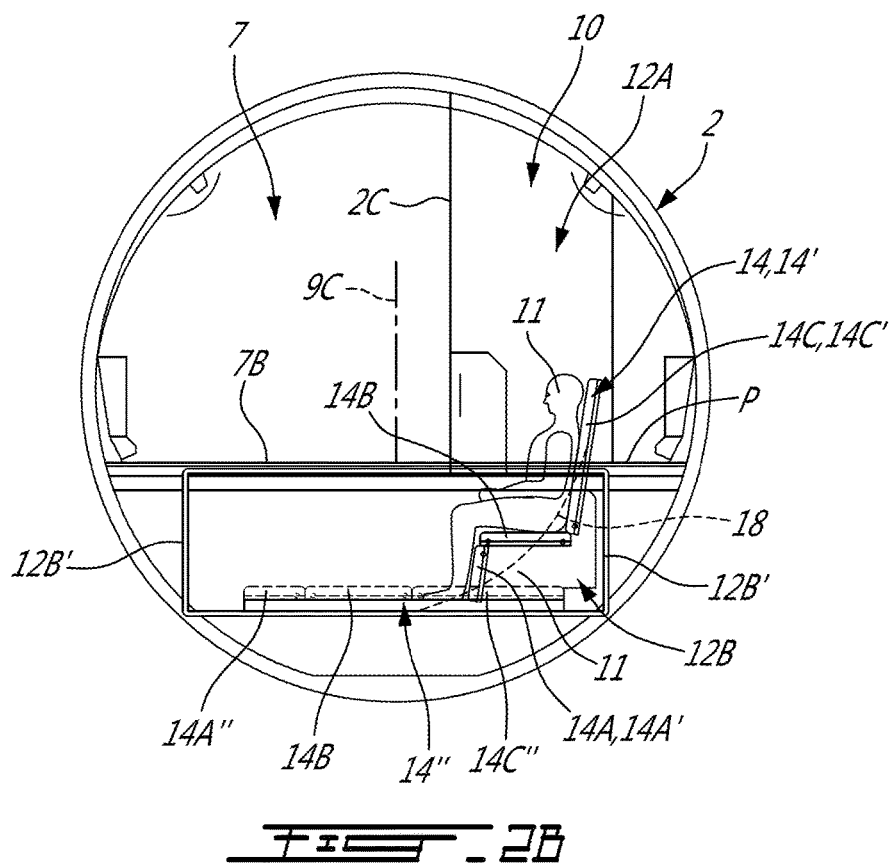
FIG. 2B is a cross-sectional view of the fuselage and the crew quarters taken along the line IIB-IIB in FIG. 2A.

Referring to FIGS. 2A and 2B, the cabin 7 also has crew quarters 10. The crew quarters 10 are an area of the cabin 7 configured to accommodate the crew members 11 of the aircraft 1 who service the passengers and/or fly the aircraft (i.e. pilots). The crew quarters 10 are intended to be used by the crew members 11 primarily, but not exclusively, for the purposes of rest or relaxation. The crew quarters 10 are typically accessed only by the crew members 11. While the crew quarters 10 are intended primarily to be used by the crew members 11, it will be appreciated that other passengers may use the crew quarters 10 in certain situations, such as during emergencies, or if there is extra space available in the crew quarters 10 because the full contingent of crew members 11 is not present, among some of the possible reasons. The crew quarters 10 may also be used to store luggage or other items, if desired.

Figure 3A:
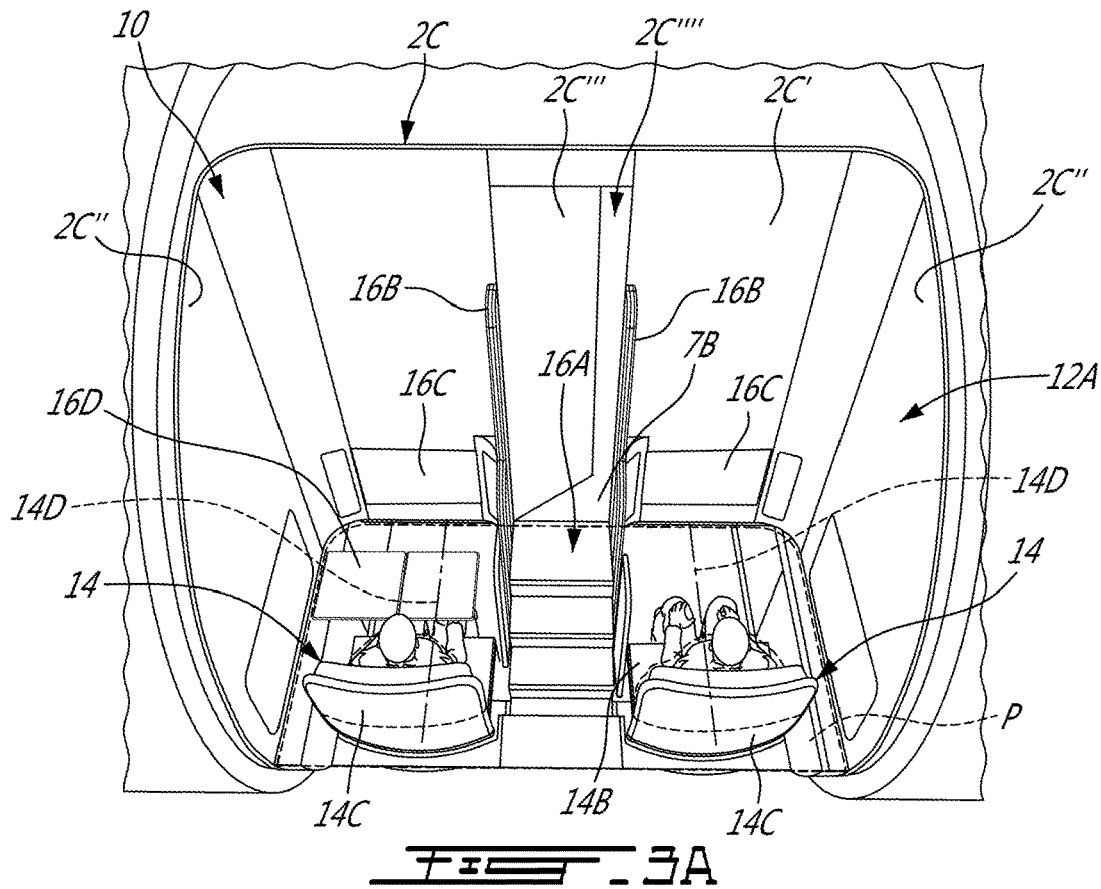
FIG. 3A is perspective view of the crew quarters of FIG. 2A and seats shown in a sitting configuration.
Figure 3B:
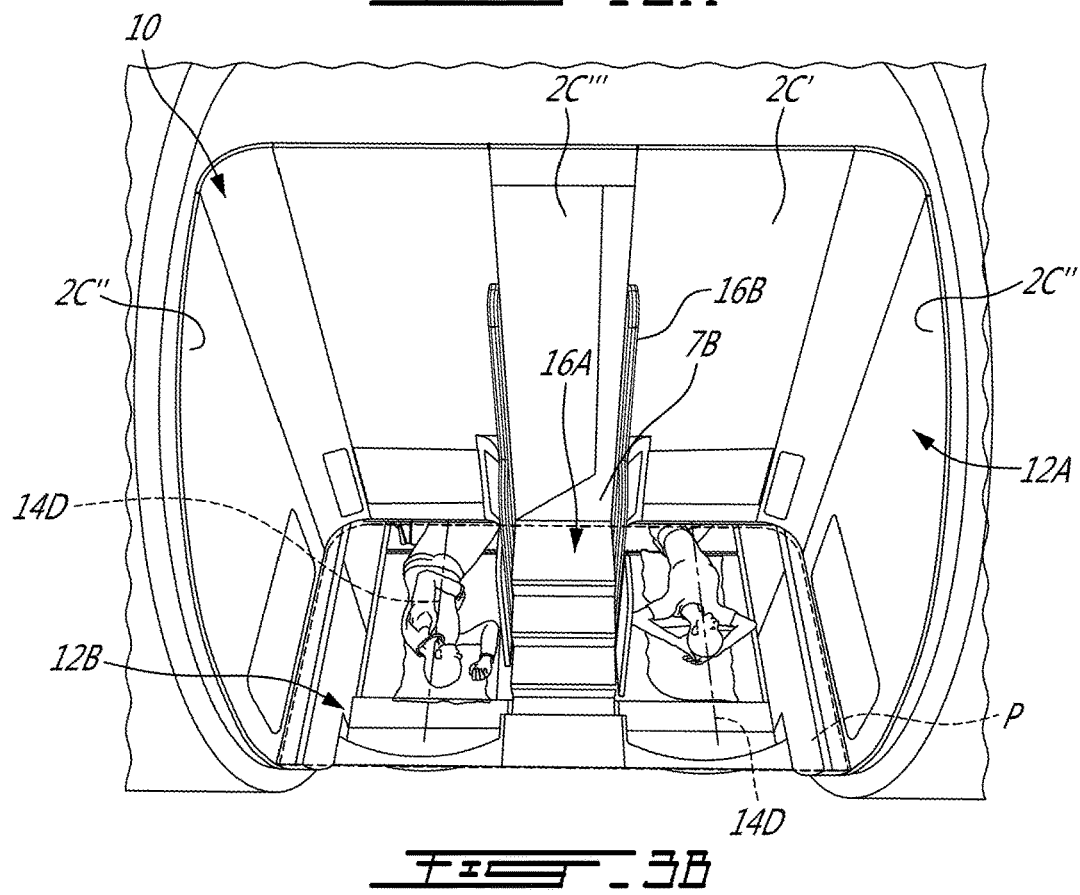
FIG. 3B is another perspective view of the crew quarters of FIG. 2A and the seats shown in a berthing configuration.

FIG. 2A shows two crew quarters 10, although the aircraft 1 may have more or fewer crew quarters 10. The crew quarters 10 may be positioned at any suitable location within the fuselage 2. In FIG. 2A, one of the crew quarters 10A are disposed aft of the entrance 2B to the fuselage and forward of the passenger section 7A. The positioning of this crew quarters 10A between the main entrance door of the aircraft 1 and the passenger section 7A of the cabin 7 serves as a buffer to isolate the passengers in the passenger section 7A from noise and cool/hot air that may enter the cabin 7 through the entrance 2B. In FIG. 2A, this same crew quarters 10A are disposed aft of the cockpit 2A of the aircraft 1 and forward of the passenger section 7A. The other crew quarters 10B are positioned aft of the passenger section 7A, towards a rear of the aircraft 1. These crew quarters 10B are at the galley 2D. The crew quarters 10A adjacent to the entrance 2B are shown in FIGS. 2B to 3C and described in relation to these figures below, and the crew quarters 10B at the galley 2D are shown in FIGS. 4A to 4C and described in relation to these figures below.

FIG. 2B is a cross-sectional view of the fuselage 2 and the cabin 7 taken in a plane that is transverse to the longitudinal axis 9B of the aircraft 1. Referring to FIGS. 2A and 2B, the crew quarters 10A are separated from the passenger section 7A of the cabin 7. By "separated", it is understood that there is a barrier which divides the crew quarters 10A from the passenger section 7A, such that passengers are generally prevented from accessing the crew quarters 10A and/or disturbing the crew members 11 resting therein. This barrier may take different forms, and is in most instances a physical barrier. For example, and as shown in FIGS. 2A and 2B, the fuselage 2 has an internal wall 2C which delimits the crew quarters 10A, and thus separates the crew quarters 10A from the passenger section 7A of the cabin 7. The internal wall 2C extends upright from the cabin floor 7B. The internal wall 2C in FIG. 2A includes an entrance segment 2C' adjacent to an aisle of the cabin 7, and end segments 2C'' which are spaced apart along the longitudinal axis 9B in a fore-aft direction. Thus, the crew quarters 10A are a single, enclosed area of the cabin 7 that is isolated from the passengers in the passenger section 7A. A door 2C'''' is hingedly mounted about an opening 2C''''' in the entrance segment 2C' of the internal wall 2C to provide access to the crew quarters 10A.

Referring to FIG. 2B, a floor plane P, defined by the cabin floor 7B, extends through the crew quarters 10A and divides the crew quarters 10A into an upper portion 12A above the floor plane P and a lower portion 12B below the floor plane P. The floor plane P is level with the cabin floor 7B outside the crew quarters 10A. The floor plane P is contiguous with the cabin floor 7B. The floor plane P has a substantially horizontal orientation when the aircraft 1 is flying in cruise condition, and when it is grounded. The floor plane P is normal to the vertical axis 9C of the aircraft 1. Referring to FIG. 2A, the crew quarters 10A,10B are a portion of the cabin 7 which are free of the cabin floor 7B (see also FIGS. 3A to 3C and FIGS. 4A to 4C). The cabin floor 7B is therefore not present in the crew quarters 10A,10B shown in FIG. 2A.

Referring to FIG. 2B, the upper portion 12A is an upper volume of the crew quarters 10A defined at its lower end by the floor plane P, and bordered by the inner surface of the fuselage 2 and the entrance and end segments 2C',2C'' of the internal wall 2C. In FIG. 2B, the upper portion 12A is empty. This provides a "vaulted" ceiling effect for the crew member 11 in the crew quarters 10A, and reduces or eliminates the sentiment of being cramped. This additional volume may also facilitate the exit of the crew member 11 from the crew quarters 10A in the event of an emergency. In an alternate embodiment, the upper portion 12A includes components, such as overhead luggage bins or storage racks or shelving. The lower portion 12B is a lower volume of the crew quarters 10A defined at its upper end by the floor plane P, and bordered by the inner surface of the fuselage 2 and lower end walls 12B' disposed in the crew quarters 10A. The lower portion 12B is thus a lower lobe of the fuselage 2 beneath the cabin floor 7B.

Still referring to FIG. 2B, the crew quarters 10A include seats 14 in which the crew members 11 sit. The seats 14 recline, and are adjustable between a sitting configuration and a berthing configuration. In FIG. 2B, the same seat 14 is shown in the sitting configuration (designated in FIG. 2B as seat 14') and in the berthing configuration (designated in FIG. 2B as seat 14''). In the sitting configuration, the seat 14' or portions thereof is upright, and the crew member 11 sitting in the seat 14' is also upright or substantially upright, it being understood that the seat 14' may be slightly reclined in the sitting configuration. In the berthing configuration, the seat 14'' is horizontal or flat, or almost completely reclined, and the crew member 11 is lying down in the seat 14'' to sleep, for example. It will be appreciated that the seat 14 may be adjusted to assume any position between the sitting and berthing configurations. Although the figures show the crew quarters 10A with two seats 14, the crew quarters 10A may have more or fewer seats 14.

When the seats 14' are in the sitting configuration, the crew members 11 in the seats 14' are within both the upper and lower portions 12A,12B of the crew quarters 10A. Thus the crew members 11 are not fully underneath the level of the cabin floor 7B when seated upright. Part of the crew member 11 is thus positioned above the floor plane P, and the rest of the crew member 11 is positioned below the floor plane P, when the seat 14' is in the sitting configuration. For example, the head and shoulders of the crew member 11 shown in FIG. 2B are above the floor plane P, and part of the torso and legs of the crew member 11 are below the floor plane P, when the seat 14' is in the sitting configuration. In an embodiment, the fuselage 2 of the aircraft 1 has a relatively small cross-sectional diameter (e.g. 115 in.), which results in insufficient space underneath the cabin floor 7B to accommodate all of the crew member 11 when seated. Therefore, allowing some of the sitting crew member 11 to be positioned above a level of the cabin floor 7B (i.e. above the floor plane P) helps to respect the smaller cross-sectional volume of the fuselage 2, while still providing space for the crew members 11 to rest comfortably and separated from a remainder of the cabin 7.

Still referring to FIG. 2B, in the berthing configuration, the crew member 11 in the seat 14'' is present in only the lower portion 12B (i.e. beneath the floor plane P). The crew quarters 10A in the berthing configuration thus provide for a below-floor rest area for the crew members 11. Thus, when the crew member 11 requires uninterrupted sleep, for example, the seat 14'' may berth to a fully-reclined position with the crew member 11 being fully below the level of the cabin floor 7B. The crew quarters 10A thus transform a volume of the fuselage 2 below the cabin floor 7B, which has sometimes conventionally been used for small baggage or for additional aircraft fuel or systems, into an efficient and comfortable rest area for the crew members 11. By occupying a portion of the fuselage 2 which has traditionally been inaccessible during flight, the crew quarters 10A provide a rest area for the crew members 11 without occupying valuable space in the cabin 7 which can otherwise be used for the passengers.

Many possible configurations for the seat 14 are possible to permit these positions of the crew member 11. For example, and referring to FIG. 2B, the seat 14 includes a foot rest 14A, a seat pan 14B, and a seatback 14C which are interconnected, or which may be separately connected to an adjacent support structure. In the sitting configuration, the foot rest 14A' and the seatback 14C' are upright. By "upright", it is understood that the foot rest 14A' and the seatback 14C' have an exact or approximate vertical orientation in the sitting configuration. In the berthing configuration, the foot rest 14A'' and the seatback 14C'' are horizontal or flat, it being understood that the foot rest 14A" and the seatback 14C" may be slightly inclined depending on the extent of recline of the seat 14" in the berthing configuration. The seat pan 14B maintains a substantially horizontal or flat orientation in both the sitting and berthing configurations. The seat pan 14B is positioned closer to the floor plane P in the sitting configuration than it is in the berthing configuration. In FIG. 2B, the foot rest 14A", the seat pan 14B, and the seatback 14C", and thus the entire seat 14", are horizontal or flat in the berthing configuration and below the floor plane P.

In both the sitting and berthing configurations in FIG. 2B, the seat pan 14B and the foot rest 14A',14A" are disposed in the lower portion 12B of the crew quarters 10A. The seatback 14C" is disposed in the lower portion 12B only in the berthing configuration. Thus, in the berthing configuration, the seat 14" is transformed into a bed. In the sitting configuration, the seatback 14C' is disposed in both the lower and upper portions 12A,12B. Thus the seat back 14C' of the seat 14' is both above and below a level of the cabin floor 7B in the sitting configuration. The seatback 14C' thus extends through the floor plane P in the sitting configuration and is transverse thereto. Allowing some of the seatback 14C' to be positioned above a level of the cabin floor 7B (i.e. above the floor plane P) in the sitting configuration helps to respect the smaller cross-sectional volume of the fuselage 2.

In FIG. 2B, each of the foot rest 14A, the seat pan 14B, and the seatback 14C are displaceable between the sitting and the berthing configurations. This can be achieved using any suitable technique. For example, in FIG. 2B, each of the foot rest 14A, the seat pan 14B, and the seatback 14C are pivotably mounted to a rail 18 and displaceable relative to the rail 18. The rail 18 in FIG. 2B is curved. Each of the foot rest 14A, the seat pan 14B, and the seatback 14C articulate about their respective pivot points as they are displaced by suitable actuation along the rail 18 between the sitting and berthing configurations. The foot rest 14A, the seat pan 14B, and the seatback 14C are thus translated in a vertical and a horizontal direction. Other mechanisms are possible for displacing the foot rest 14A, the seat pan 14B, and the seatback 14C FIGS. 3A and 3B show an example of the interior of the crew quarters 10A. The entrance and end segments segment 2C',2C" of the internal wall 2C are shown from the inside of the crew quarters 10A. The door 2C'" mounted about the opening 2C"" in the entrance segment 2C' provides access to the crew quarters 10A from the cabin floor 7B. A staircase 16A leads down from the door 2C'" and the cabin floor 7B towards the seats 14, which are shown in FIG. 3A in the sitting configuration and shown in FIG. 3B in the berthing configuration. Handle bars 16B mounted to the entrance segment 2C' of the internal wall 2C support the crew members 11 as they climb and descend the stairs of the staircase 16A. In FIGS. 3A and 3B, the upper portion 12A of the crew quarters 10A is shown free of objects or obstructions. The crew quarters 10A may be equipped with any suitable objects for the crew members 11. For example, the crew quarters 10A in FIG. 3A includes monitors 16C and tray tables 16D. Some non-limiting examples of other objects which may also be present in the crew quarters 10A include racks/shelving/bins for storage of personal items, gaspers, reading lights, and emergency equipment.

The seats 14 and the crew members 11 are in the sitting configuration in FIG. 3A. The floor plane P intersects upper parts of the crew members 11 and upper parts of the seats 14 in FIG. 3A. The seats 14 and the crew members 11 are in the berthing configuration in FIG. 3B. The floor plane P lies above the entirety of the crew members 11 and the entirety of the seats 14 in FIG. 3B. It can thus be appreciated that the crew members 11 are not fully underneath the level of the cabin floor 7B when seated upright, and are fully underneath the level of the cabin floor 7B only when they are lying down.

Referring to FIG. 3B, the crew members 11 in the berthing configuration are lying down in the seats 14 in the lower portion 12B of the crew quarters 10A. In an alternate embodiment, the crew members 11 in the berthing configuration are almost fully reclined in the seats 14 and positioned beneath the floor plane P. In an embodiment, the seats 14 are electrically actuated and have a minimum length of about 80 in. when transformed into a bed. In another embodiment, the seats 14 have a minimum length of about 100 in. when transformed into a bed. The crew quarters 10A therefore provide for a crew rest area that allows a lie-down berthing area under the level of the cabin floor 7B. The crew quarters 10A thus allow for the use of an underfloor volume of the fuselage 2 to accommodate the crew members 11.

Referring to FIGS. 3A and 3B, the two seats 14 are spaced apart from each other along the longitudinal axis 9B of the aircraft 1, i.e. in the fore-aft direction. Each of the seats 14 includes a seat axis 14D that is transverse to the longitudinal axis 9B. The seats 14 and the crew members 11 sitting in them are thus oriented, in both the sitting and berthing configurations, laterally in relation to the longitudinal axis 9B.

Figure 3C:
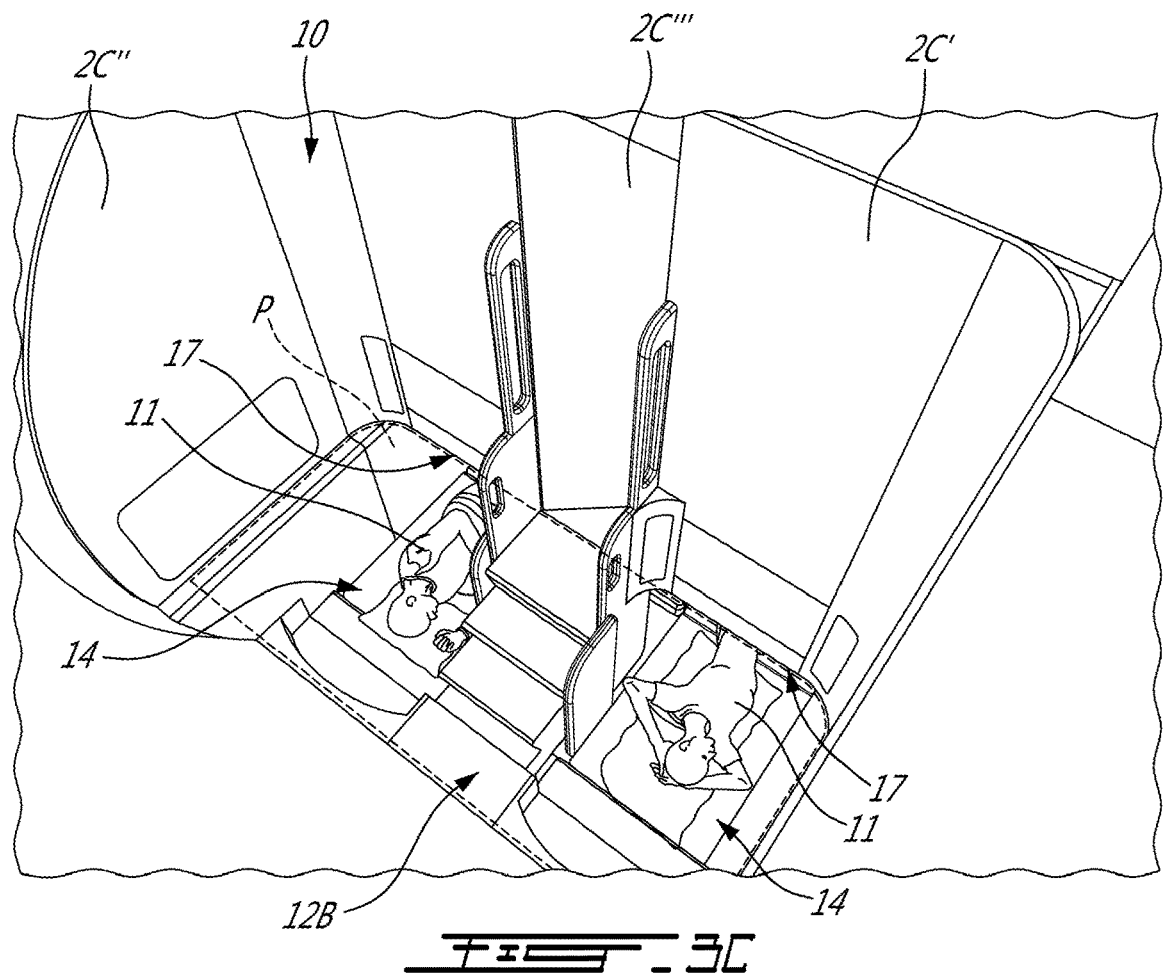
FIG. 3C is another perspective view of the crew quarters of FIG. 2A and the seats shown in a berthing configuration.
Figure 3D:
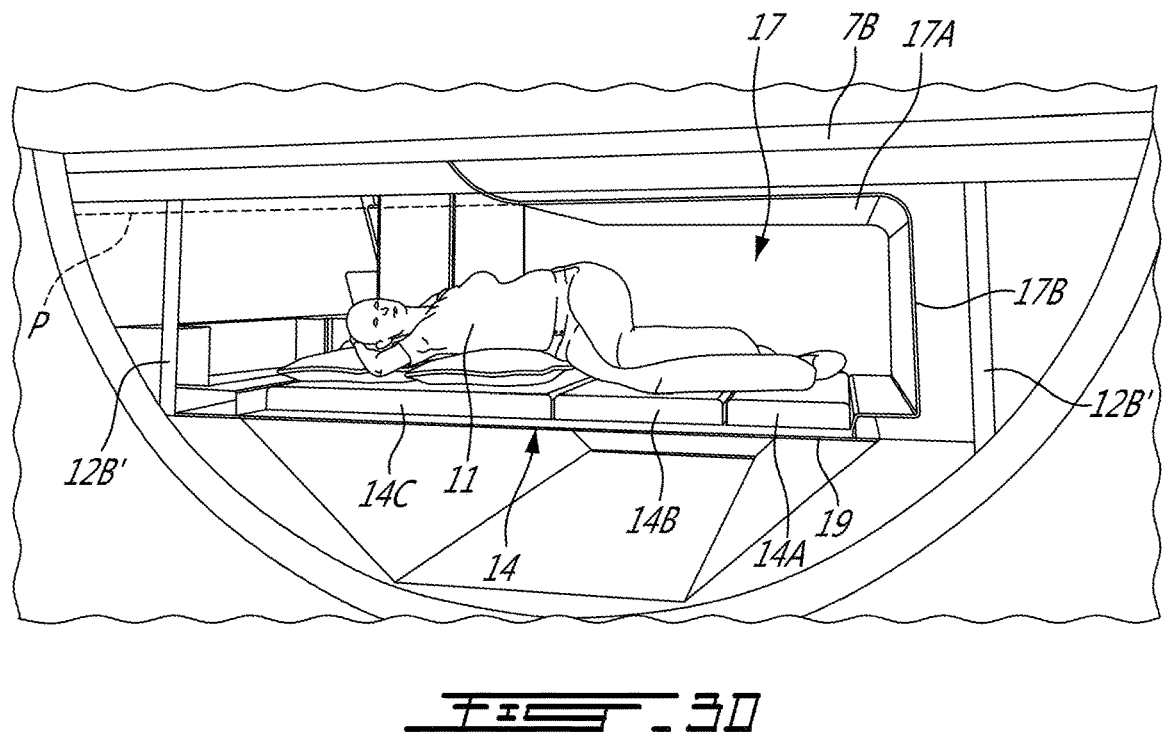
FIG. 3D is a perspective side view of a lower portion of the crew quarters of FIG. 2A and a berthing cavity.
Figure 4A:
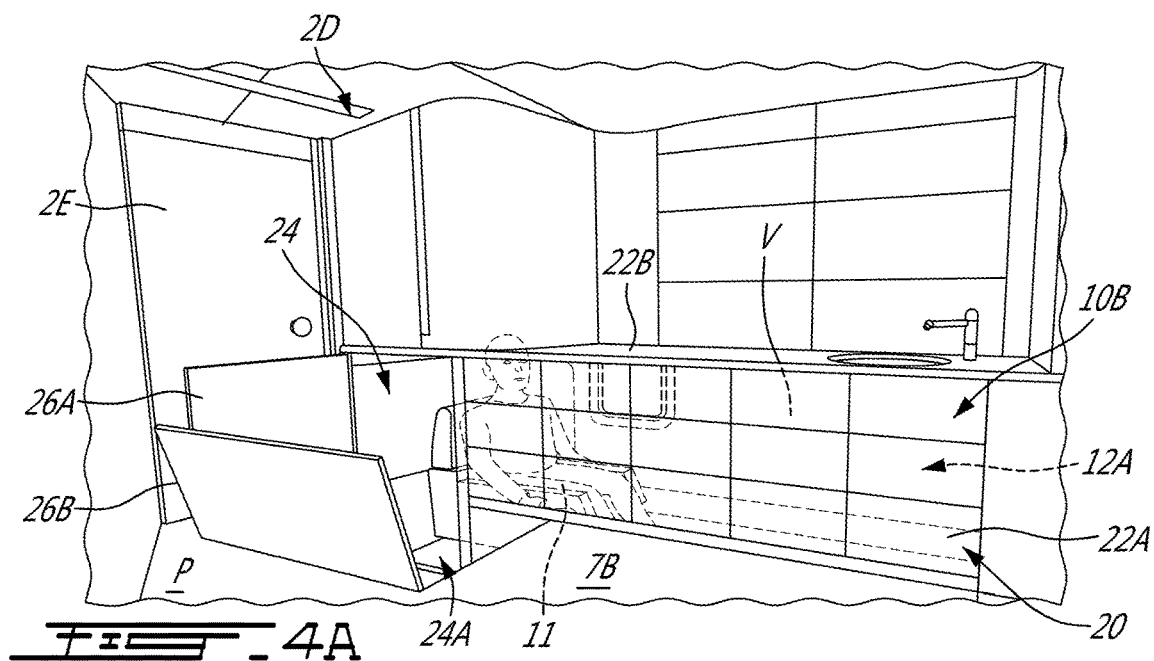
FIG. 4A is a perspective view of another crew quarters of the cabin of the aircraft of FIG. 1.
Figure 4B:
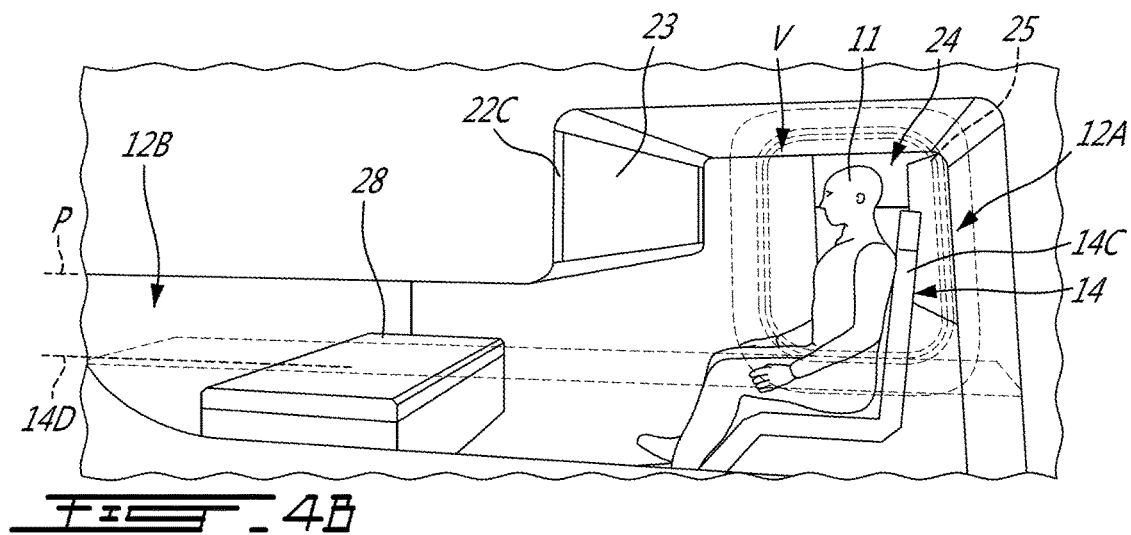
FIG. 4B is a perspective side view of upper and lower portions of the crew quarters of FIG. 4A, with a seat shown in a sitting configuration.
Figure 4C:
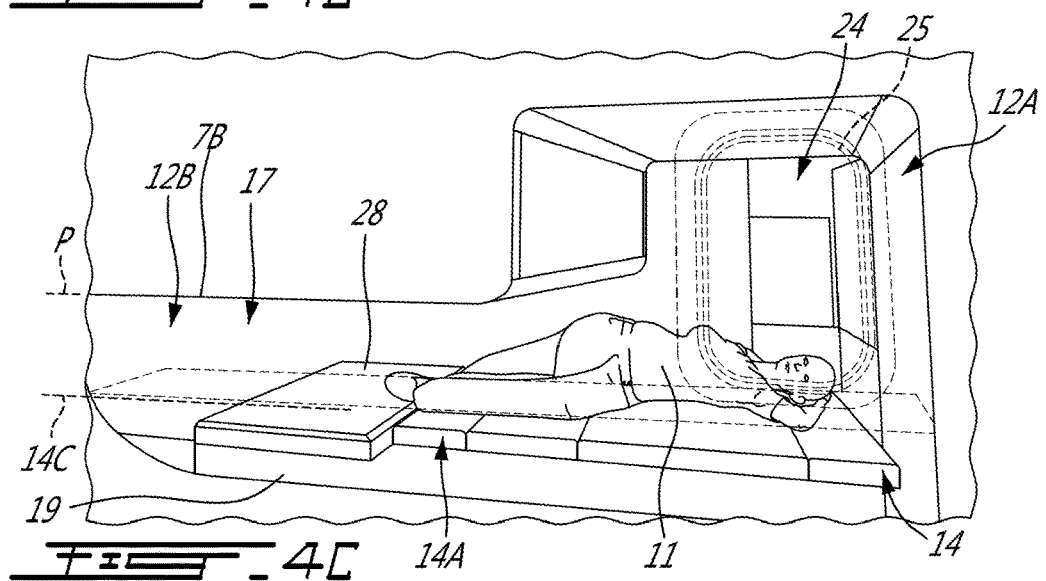
FIG. 4C is a perspective side view of upper and lower portions of the crew quarters of FIG. 4A, with a seat shown in a berthing configuration.

Referring to FIGS. 3C and 3D, the lower portion 12B of the crew quarters 10A includes berthing cavities 17. Each berthing cavity 17 is an opening in the crew quarters 10A which accommodates one of the crew members 11 when lying down. Referring to FIG. 3D, each berthing cavity 17 is delimited at an upper end by the cabin floor 7B and at a lower end by a crew quarters floor 19. Some or all of the crew member 11 in the seat 14 is within the berthing cavity 17, and thus beneath the floor plane P, when in the berthing configuration. Thus when lying down, part of the crew member 11 is directly underneath the cabin floor 7B. The berthing cavity 17 thus provides a crew rest that allows a lie-down berthing area under the cabin floor 7B. Referring to FIG. 3D, the berthing cavity 17 is delimited along an upper end by an upper berthing cavity wall 17A spaced below the cabin floor 7B, and along a lateral end by a berthing cavity end wall 17B spaced inwardly from one of the lower end walls 12B'. In FIG. 3D, the foot rest 14A, the seat pan 14B and part of the seatback 14C are positioned within the berthing cavity 17 and beneath the floor plane P in the berthing configuration. In an embodiment, the berthing cavity 17 is 95 in. in length. Other lengths for the berthing cavity 17 are possible.

Referring to FIG. 2B, there is also disclosed a method of transitioning the crew member 11 to the berthing configuration in the crew quarters 10A. The method includes sitting in the seat 14 such that part of the crew member 11 is above a level of the cabin floor 7B and another part of the crew member 11 is below the level of the cabin floor 7B. The method includes reclining the seat 14 such that the crew member 11 is beneath the level of the cabin floor 7B in the berthing configuration.

The crew quarters 10B at the galley 2D are now described in greater detail with reference to FIGS. 4A to 4C. The galley 2D is a compartment or region of the aircraft 1 where food is cooked, stored and/or prepared. In FIGS. 4A to 4C, the galley 2D is an area of the cabin 7 that is closed-off from the remainder of the cabin 7 by a door 2E. In an alternate embodiment, the galley 2D is continuous with the remainder of the cabin 7, or with a section thereof (e.g. the passenger section 7A).

The crew quarters 10B are within the galley 2D. It is understood by "within" that the crew quarters 10B are partially or completely housed, sheltered or hidden from view by the galley 2D or components thereof. One possible example of this arrangement is described in greater detail below. Similarly to the crew quarters 10A described above, the crew quarters 10B have an upper portion 12A above the floor plane P and a lower portion 12B beneath the floor plane P. The crew quarters 10B also has one or more seats 14 that is adjustable between the sitting and berthing configurations. Therefore, the description above of the features and functionality of the upper portion 12A, the lower portion 12B and the seat 14 of the crew quarters 10A applies mutatis mutandis to these features of the crew quarters 10B.

One possible example of the crew quarters 10B being within the galley 2D is shown in FIG. 4A. The galley 2D has a cabinet 20 which extends upwardly from the cabin floor 7B. The cabinet 20 is above the floor plane P. The cabinet 20 is an enclosed body, and defines an interior volume V. In FIG. 4A, the cabinet 20 and its interior volume V are delimited by an upright wall 22A and a counter 22B or counter-top upon which items can be rested or placed. The upright wall 22A may include doors, drawers, handles or other features associated with cabinets and cabinetry. The galley 2D may include one or more additional cabinets 20, and may also include other features including, but not limited to, a sink, an oven, a stove, stowage bays for galley carts, etc.

The interior volume V of the cabinet 20 forms part or all of the upper portion 12A of the crew quarters 10B. The interior volume V of the cabinet 20 is a fraction of the upper portion 12A, and of the total volume of space of the crew quarters 10B. The crew quarters 10B are thus housed or covered by the cabinet 20 in FIG. 4A. Any routing of electric, water or waste lines that may typically be present in the cabinet 20 or the lower part of the galley 2D may be routed above or behind the cabinet 20.

The crew quarters 10B is thus situated within the galley 2D and one of its cabinets 20. This positioning of the crew quarters 10B allows the ceiling of the crew rest area to rise above the cabin floor 7B level without interfering with the layout of the cabin 7. The crew quarters 10B include space beneath the cabin floor 7B in addition to the lower part of the galley 2D. The maximum height of the crew quarters 10B within the galley 2D may be adjusted as desired, for example by adjusting the distance between the counter 22B and the cabin floor 7B, to allow for a crew member 11 to be comfortably seated and upright in the sitting configuration. In an embodiment, the length of the crew quarters 10B is about 80 in. Having this elongated body away from the main cabin 7 area may allow for freeing-up a cabin length of about 80 in. for other use by the customer/owner of the aircraft 1, essentially increasing the volume of the cabin 7. For a clean sheet design of the aircraft 1, the configuration of the crew quarters 10B may allow for shortening the length of the fuselage 2 relative to a baseline design with a crew rest area on the main cabin floor.

Referring to FIG. 4A, the crew quarters 10B has one or more access openings 24 which allow the crew member 11 to enter and exit the crew quarters 10B. In FIG. 4A, the access openings 24 are closeable apertures. In an alternate embodiment, one or more of the access openings 24 are permanently left open. In FIG. 4A, part of the access opening 24 is formed in part of the upright wall 22A of the cabinet 20. The cabinet 20, or any other structure adjacent to the access opening 24, has a door 26A to open and close the access opening 24. The door 26A in FIG. 4A is hingedly mounted to the upright wall 22A. In FIG. 4A, the access opening 24 also has a portion defined in the cabin floor 7B, referred to as a floor portion 24A of the access opening 24. The floor portion 24A is adjacent to the upright wall 22A, and continuous with the remainder of the access opening 24. A trap door 26B is hingedly mounted to the cabin floor 7B to open and close the floor portion 24A. The crew quarters 10B may have stairs, railings, or other suitable structure to facilitate entry and exit of the crew member 11. In an alternate embodiment, some or all of the access opening 24 is closeable with a curtain or other flexible structure. The closure structures which block or cover the access openings 24 help to separate the crew quarters 10B from a remainder of the cabin 7 and a remainder of the galley 2D.

Referring to FIGS. 4B and 4C, the lower portion 12B of the crew quarters 10B includes berthing cavities 17. Each berthing cavity 17 is an opening in the crew quarters 10B which accommodates one of the crew members 11 when lying down. Referring to FIG. 4C, each berthing cavity 17 is delimited at an upper end by the cabin floor 7B and at a lower end by a crew quarters floor 19. Some or all of the crew member 11 in the seat 14 is within the berthing cavity 17, and thus beneath the floor plane P, when in the berthing configuration. Thus when lying down, part of the crew member 11 is directly underneath the cabin floor 7B. The berthing cavity 17 thus provides a crew rest that allows a lie-down berthing area under the cabin floor 7B.

Referring to FIGS. 4B and 4C, the crew quarters 10B include an ottoman or additional foot cushion 28 positioned at the end of the seat 14 when it is in the berthing configuration. As shown in FIG. 4C, the foot rest 14A of the seat 14 abuts against the foot cushion 28 when the seat 14 is in the berthing configuration, thereby increasing the length of the seat 14 when the crew member 11 wants to lie down. Referring to FIGS. 4B and 4C, the seatback 14C is within interior volume V of cabinet 20 when the seat 14 is in the sitting configuration. The seatback 14C is partially above the floor plane P within interior volume V of cabinet 20 when the seat 14 is in the sitting configuration.

In an embodiment, the seat 14 is displaceable to facilitate ingress and egress of the crew member 11 into and from the crew quarters 10B. The seat 14 may be mounted on rails which allow it to slide out of the crew quarters 10B through the access openings 24, to position the seat 14 in the galley 2D. Once the crew member 11 is seated within the seat 14 in its sitting configuration, the seat 14 may be slid back through the access openings 24 and into the crew quarters 10B. Such a displaceable seat 14 may help the crew member 11 enter the crew quarters 10B, and exit therefrom. In an embodiment, the crew quarters 10B include multiple seats 14 which are stackable above one another when they are in the berthing configuration. The seats 14 are stacked vertically spaced apart from each other in the berthing configuration. Such a configuration of the seats 14 may allow for two or more crew members 11 to rest in the crew quarters 10B.

An interior wall 22C of the cabinet 20 is shown in FIG. 4B and partially delineates the interior volume V. A monitor 23, shelving, or other suitable structure is mounted or part of the interior wall 22C to provide entertainment to the crew member 11. The crew quarters 10B include a window 25 in a wall of the fuselage 2. The window 25 may also function as an emergency exit which would allow the crew member 11 to egress in case of emergency. The window 25 may also improve the comfort of the crew quarters 10B.

In FIGS. 4A to 4C, the seat axis 14D is transverse to the longitudinal axis 9B of the aircraft 1. The seat axis 14D may alternatively be parallel to the longitudinal axis 9B. In such an embodiment, the seats 14 and the crew members 11 sitting in them are thus oriented, in both the sitting and berthing configurations, parallel to the longitudinal axis 9B.

The crew quarters 10A,10B contribute to improving the comfort of the crew members 11 during rest while minimizing the impact a crew rest area might have on the remainder of the space in the cabin 7. This may increase the amount of space in the cabin 7 available to the owner of the aircraft 1, which increases possibilities to be creative in the interior design of the cabin 7.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft, comprising: a fuselage including a cabin delimited by a cabin floor and having a passenger section and crew quarters separated from the passenger section, the crew quarters including an upper portion above a floor plane defined by the cabin floor and a lower portion beneath the floor plane, the crew quarters including a seat being adjustable between a sitting configuration and a berthing configuration, the seat being upright in the sitting configuration such that a crew member in the seat is within both the upper and lower portions of the crew quarters, and the crew member in the seat is only within the lower portion in the berthing configuration.

2. The aircraft of claim 1, wherein the crew member in the berthing configuration is lying down in the seat in the lower portion of the crew quarters.

3. The aircraft of claim 1, wherein the seat is horizontal in the berthing configuration.

4. The aircraft of claim 1, wherein the seat includes a foot rest, a seat pan, and a seatback, the foot rest and the seatback being upright in the sitting configuration, the foot rest and the seatback being horizontal in the berthing configuration.

5. The aircraft of claim 4, wherein the seat pan and the foot rest are disposed in the lower portion in the sitting and berthing configurations.

6. The aircraft of claim 4, wherein the seatback is disposed in the lower portion in the berthing configuration.

7. The aircraft of claim 4, wherein the seatback is disposed in both the lower and upper portions in the sitting configuration.

8. The aircraft of claim 4, wherein the lower portion includes a berthing cavity delimited at an upper end by the cabin floor and at a lower end with a crew quarters floor, the foot rest being positioned within the berthing cavity in the berthing configuration.

9. The aircraft of claim 1, wherein the lower portion includes a berthing cavity delimited at an upper end by the cabin floor and at a lower end with a crew quarters floor, at least part of the crew member in the seat being within the berthing cavity in the berthing configuration.

10. The aircraft of claim 1, wherein the fuselage has an internal wall extending upright from the cabin floor and delimiting the crew quarters, a door being hingedly mounted about an opening in the internal wall to provide access to the crew quarters.

11. The aircraft of claim 1, wherein the crew quarters are disposed aft of a forward entrance to the fuselage and forward of the passenger section.

12. The aircraft of claim 1, wherein the crew quarters are disposed aft of a cockpit of the aircraft and forward of the passenger section.

13. The aircraft of claim 1, wherein the seat includes seat axis being transverse to a longitudinal axis of the aircraft.

14. The aircraft of claim 1, wherein the seat is a first seat and the crew quarters include a second seat, the first and second seats being spaced apart along a longitudinal axis of the aircraft, the first and second seats including a seat axis being transverse to the longitudinal axis.

15. A method of transitioning a crew member of an aircraft to a berthing configuration in a crew quarters of the aircraft, the method comprising: sitting in a seat in the crew quarters such that part of the crew member is above a level of a floor of a cabin of the aircraft and another part of the crew member is below the level of the floor, and reclining the seat such that the crew member is only beneath the level of the floor in the berthing configuration.

16. The method of claim 15, wherein reclining the seat includes reclining the seat such that legs of the crew member are underneath the floor of the cabin in the berthing configuration.

17. The method of claim 15, comprising descending stairs from the floor of the cabin to the seat.

18. The method of claim 15, comprising entering the crew quarters via an opening in an internal wall separating the crew quarters from a remainder of the cabin of the aircraft.

19. The method of claim 15, wherein reclining the seat includes reclining the seat in a direction transverse to a longitudinal axis of the aircraft.

* * * * *